May 4, 1937.  E. E. WEMP  2,079,389
CLUTCH PLATE STRUCTURE
Original Filed Dec. 26, 1930
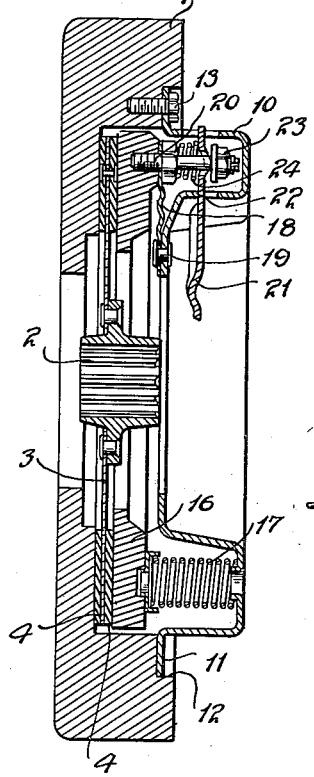
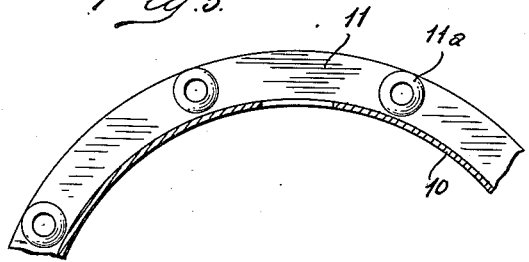
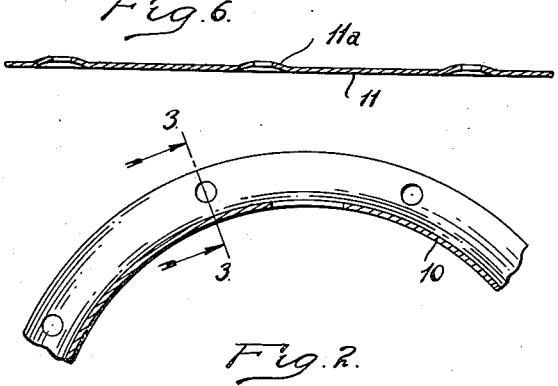
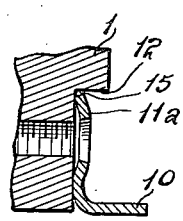
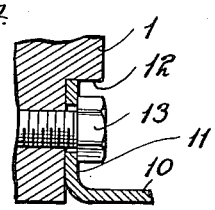
INVENTOR.
ERNEST E. WEMP.
BY
Barnes, Kisselle & Laughlin
ATTORNEYS.

Patented May 4, 1937

2,079,389

UNITED STATES PATENT OFFICE 2,079,389

CLUTCH PLATE STRUCTURE

Ernest E. Wemp, Detroit, Mich.

Original application December 26, 1930, Serial No. 504,841. Divided and this application December 18, 1933, Serial No. 702,925

10 Claims. (Cl. 192—68)

This invention relates to a clutch and it has to do particularly with a clutch structure including a clutch cover plate secured to another clutch member, as for example, one of the clutch driving members.

The principal object of the invention is to provide a structure and cover plate arrangement wherein upon assembly of the clutch cover and associated parts the same is centered and balanced. This application is a division of application Serial No. 504,841, filed December 26, 1930, and now Patent No. 1,944,337.

In the drawing:

Fig. 1 is a sectional view taken through a clutch structure showing a flywheel and cover plate arrangement.

Fig. 2 is a fragmental view showing the flange of the cover plate in rear elevation.

Fig. 3 is a cross sectional view taken substantially on line 3—3 of Fig. 2 and illustrating the relation of the flywheel and cover plate before assembly.

Fig. 4 is a cross sectional view similar to Fig. 3 showing the flywheel and cover plate in assembly.

Fig. 5 is a fragmentary view of a modified form of the invention and illustrating the flange of the cover plate in rear elevation.

Fig. 6 is a sectional view taken through the flange shown in Fig. 5.

Referring now to the drawing, the clutch is shown in the form of one designed for an automotive vehicle and associated with an engine flywheel. Such engine flywheel is illustrated at 1. The driven parts of the clutch consist of a hub 2 designed to be mounted upon a driven shaft, a driven disc 3 secured to the hub and provided with clutch facing material 4. It is to be understood, of course, that the invention may be utilized in places other than in an automotive vehicle, although that environment is selected for the purpose of illustrating the invention.

The driving parts of the clutch, other than the flywheel, consist of a cover plate 10. This cover plate is provided with a peripheral flange 11 adapted to be secured to the flywheel. The flywheel may be recessed as shown providing a circumferential shoulder 12, and the flange 11 is designed to fit into the recess and be secured to the flywheel by screws 13.

A pressure plate is illustrated at 16 and this may be carried by the cover plate through devices later to be described so that it may move axially. Clutch packing springs are provided and these are shown at 17 positioned between the cover plate and pressure plate. It will be appreciated that when the springs are unrestrained that they move the pressure plate axially so that the friction material of the driven plate is packed between the pressure plate and a portion of the flywheel on the opposite side of the friction material.

Insofar as the present invention is concerned the pressure plate, release levers, and other associated parts may take any desired form, but Fig. 1 shows the arrangement covered in the parent application. In this arrangement the pressure plate 16, as heretofore stated, may be carried by the cover plate, and the carrying means comprise one or more members capable of such flexing and variation as to permit of the movement of the pressure plate, while at the same time, the pressure plate may be held centered or balanced. These driving or carrying members are shown at 18 and three of such may be used in the clutch structure. They are advantageously of sheet metal or plate formation capable of flexing to permit the pressure plate to move axially and also capable of variation in radial length. These members may be riveted or otherwise secured to the cover plate as at 19 and secured to the pressure plate as by means of studs 20 or the like. To release the pressure plate or to in other words retract it against the action of the packing springs 17, suitable releasing levers 21 are provided which fulcrum on the cover plate as at 22 and which have apertures through which the studs 20 pass, the studs being provided with a nut or the like 23. Small springs 24 may be utilized to hold the nut 23 and the adjacent part of the lever in contact.

The cover plate, when properly held in the recess of the flywheel, may be in balanced relation and to facilitate this balancing and assembly, the flange 11 may be normally crowned or provided with a curved cross-sectional shape as illustrated in Fig. 3. When the bolts 13 are screwed down tightly the crowned flange is flattened out as illustrated in Fig. 4. This effects an increase in the overall diameter of the flange with the result that the peripheral edge of the flange abuts against or substantially jams against the shoulder 12 of the flywheel. This positively positions the cover plate as regards the flywheel with the result that the cover plate is centered during assembly and held centered thereafter. Also assembly is facilitated for a slight clearance is afforded between the peripheral edge of the flange 11 and the shoulder 12 when the cover plate is inserted to position; this is illustrated at 15 (Fig. 3) in an exaggerated manner. Instead of crowning the entire flange it may be crowned or slightly embossed locally, as is shown in Fig. 5, wherein the local crown formations are shown as immediately surrounding the cap screw holes, as at 11a, Figs. 5 and 6. Tightening of the cap screws urges outwardly the peripheral edge near the cap screws. The cap screws are loose in the apertures to provide clearance so that there will be no binding action when the flange is flattened and the cover plate centered. This is shown in an exaggerated manner in Figs. 3 and 4.

In this manner the cover plate may be centered and balanced and it will remain in this condition. The cap screws extending through the apertures therefor in the flange are not relied upon to center the cover plate but merely serve to hold it in position and the result is that nice working clearances may be provided between the cap screws and their respective apertures.

In the claims appended hereto which use the term flywheel, it is to be understood that such use is in a broad sense and is intended to cover a rotary clutch driving member although it may not constitute the only element in the nature of a flywheel.

I claim:

1. In a clutch, the combination of a flywheel having a recess bounded by a wall, a cover plate with an outer peripheral flange, said flange being normally crowned and adapted to fit into the recess, and means for securing the cover plate to the flywheel and adapted to flatten the crowned flange, said means being loose relative to the cover plate to provide for relative movement when the flange is flattened, whereby the peripheral edge may be caused to substantially abut against the recess wall and the cover plate thus centered.

2. In a clutch, the combination of a flywheel or the like provided with a recess bounded by a circumferential wall, a cover plate with an outer rim adapted to fit in the recess, said rim being normally crowned and having apertures therein, and bolts or the like passing loosely through the apertures and securing it to the flywheel, said bolts adapted to flatten the crowned rim and increase its diameter whereby the peripheral edge may be caused to substantially jam against the peripheral wall of the recess and the cover plate centered.

3. In a clutch, a rotary clutch member having an abutment face disposed substantially in the plane of rotation, abutment means extending substantially axially adjacent the face, another clutch member having an outer rim, said rim being crowned and adapted to be moved up against the abutment face clearing the abutment means, and means associated with the rim for relative radial movement for securing the rim to the said clutch member and adapted to flatten the crowned rim whereby the same may be expanded into contact with the abutment means to be centered thereby.

4. In a clutch, a rotary clutch member having an abutment face, a peripheral wall extending substantially at right angles to the abutment face, a clutch cover plate having a peripheral rim crowned throughout its extent and adapted to be brought up against the abutment face, and means associated with the rim for substantially free relative radial movement for clamping the rim to the abutment face and adapted to flatten the crowned rim to increase its width and cause the edge thereof to abut against the said wall whereby the clutch cover plate may be centered thereby.

5. In a clutch, a flywheel provided with a recess bounded by a wall, a clutch cover plate, said clutch cover plate having an outer rim crowned throughout its extent and disposed in said recess, said rim having apertures therein, and cap screws or the like passing loosely through the apertures into the flywheel for connecting the rim to the flywheel and adapted to flatten the rim to thereby increase the rim diameter and cause the edge thereof to abut against the said wall whereby the clutch cover plate may be centered.

6. In a clutch, a rotary clutch member having a recess bounded by a wall, a clutch cover plate having an outer rim, said rim having local crowned portions disposed in circumferentially spaced relation and in close proximity to the outer edge of the rim, and said rim being disposed in said recess, and cap screws or the like extending loosely through apertures in the rim for securing the rim to the said clutch member and adapted to flatten the crowned portions whereby to cause edge portions of the rim to expand against the wall so that the clutch cover plate may be centered thereby.

7. In a clutch, a clutch member with a recess bounded by a wall, a clutch cover plate having an outer rim for disposition in the recess, said rim having local crowned portions disposed in circumferentially spaced relation and having an aperture through each crowned portion, said portions being disposed in close proximity to the edge of the rim, and cap screws or the like for securing the rim to the clutch member, said cap screws passing loosely through the apertures and adapted to flatten the crowned portions to cause edge portions of the rim to expand into abutting relation with the wall whereby the clutch cover plate may be centered.

8. A clutch cover plate for attachment to a recessed clutch member comprising, a plate member with a crowned outer rim adapted to be located in the recess, said rim having apertures therein for loosely receiving cap screws or the like, said rim adapted to be flattened by the cap screws when the same are secured to the clutch member whereby the rim is expanded into contact with the recess wall and the plate member is centered thereby.

9. A clutch cover plate for attachment to a recessed clutch member, comprising a body having an outer rim transversely crowned throughout its extent and adapted to be located in the recess and bolted thereto, said rim having apertures for loosely receiving bolts and said rim being adapted to be flattened by the bolts to expand in the recess when bolted to the clutch member.

10. A clutch cover plate adapted to be secured in the recess of a clutch member, comprising a plate member having an outer rim, said rim having local crowned portions adjacent the outer edge of the rim and each crowned portion having an aperture therethrough for loosely receiving a bolt, said crowned portions adapted to be flattened when the plate member is bolted to the clutch member whereby said crowned portions of the rim expand into contact with the recess wall and the plate member centered thereby.

ERNEST E. WEMP.

CERTIFICATE OF CORRECTION.

Patent No. 2,079,389.   May 4, 1937.

ERNEST E. WEMP.

It is hereby certified that error appears in the printed specification of the above numbered patent requiring correction as follows: Page 2, first column, line 37, claim 1, after "edge" insert the words of the cover plate; and that the said Letters Patent should be read with this correction therein that the same may conform to the record of the case in the Patent Office.

Signed and sealed this 29th day of June, A. D. 1937.

Henry Van Arsdale (Seal)   Acting Commissioner of Patents.